June 27, 1950     E. L. MAGER     2,512,866

METHOD OF COATING CURVED TUBING

Filed Jan. 24, 1946

INVENTOR
*Eric L. Mager*
BY *Lawrence Burns*
ATTORNEY

Patented June 27, 1950

2,512,866

UNITED STATES PATENT OFFICE 2,512,866

METHOD OF COATING CURVED TUBING

Eric L. Mager, Peabody, Mass., assignor to Sylvania Electric Products Inc., Salem, Mass., a corporation of Massachusetts Application January 24, 1946, Serial No. 643,047

1 Claim. (Cl. 117—33.5)

This invention relates to electric gaseous discharge devices provided with a coating of luminescent material, and more particularly to fluorescent lamps.

An object of this invention is to provide a method of coating fluorescent lamps of the curved type.

Another object of this invention is to provide a method of coating fluorescent lamps of the curved type which will result in a coating of smooth texture.

A further object of this invention is to provide a thin, even film of coating material on the interior surface of the glass tubing during the coating process.

Further objects, advantages and features of this invention will be apparent from the following description when considered in conjunction with the accompanying drawing in which.

Figure 4:
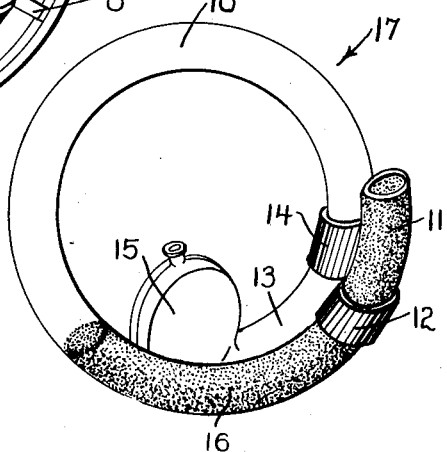
Figure 5:
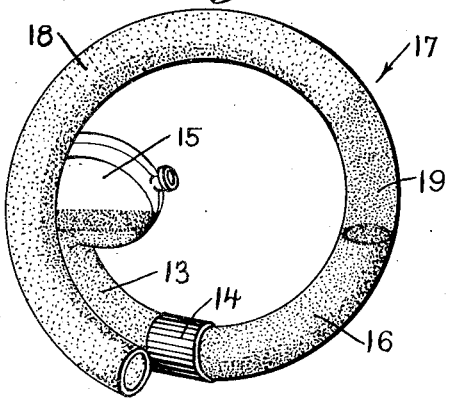

Figure 4 is a plan view of a curved tube and the auxiliary apparatus employed in the coating process connected thereto, showing the position of the tube and the coating suspension therein at the start of the coating process; and Figure 5 is a plan view of the same elements as those illustrated in Figure 4, showing the position of the tube and the coating suspension therein during a late stage of the coating operation.

It has been the practice in coating fluorescent lamps of conventional contour to apply a suspension of luminescent material to the inner wall of an elongated glass tube by flushing the inner wall of the tube with the suspension of luminescent material, permitting the excess to run off and the residue to dry. One method of coating the elongated tube is to support the tube in a vertical plane and introduce the luminescent coating suspension at the top thereof and permit the suspension to drain down through the tube. Another method of coating the elongated glass tube is to cause a column of luminescent material suspension to rise up into the tube from the bottom thereof until the entire tube is filled with the suspension and then permitting the suspension to run down by force of gravity, leaving a coating of luminescent material on the inner wall of the tube.

All attempts at adapting such methods to the application of a coating of luminescent material to the inner walls of a curved tube have proved unsuccessful because no matter how the curved tube is manipulated after its interior surface is flushed with a suspension of luminescent material, it has been found to be impossible to prevent the suspension from drying in irregular streaks.

The method which I have developed to provide a curved tube with a coating of luminescent material which is smooth in texture and free from streaks embodies the idea of mounting the curved glass tube in a vertical plane, partially filling it with a suspension of luminescent material and then rotating the tube slowly so as to deposit a thin, even film of the suspension on the inner wall of the tube.

Although I have found this method of applying the coating to be more satisfactory than the methods described above in connection with the coating of the conventional elongated tubes, I have found that certain distinct changes must be made in the nature of the coating suspension itself in order to obtain a satisfactorily coated tube. For example, I have found that the solvent portion of the lacquer in which the luminescent material is suspended must have a very high evaporation rate as compared to the evaporation rate of the solvent portion of the lacquer used in the coating of fluorescent lamps of the conventional type. I have also found that the viscosity of the fluorescent suspension used in coating curved tubes must be substantially greater than the viscosity of the fluorescent suspension normally used in coating tubes for the conventional type of fluorescent lamps.

The coating suspensions described in the following examples have proved satisfactory:

Example 1

Solvent composition: 75% acetone, 25% ethyl ether
Binder: 1200 sec. R. S. nitrocellulose wet with 30% ethanol
Fluorescent material: 3500° white phosphor
Plasticizer: diethyl phthalate equal to the weight of the wet nitrocellulose
Viscosity: 4000 centipoises
Specific gravity: 1.13
Rate of rotation: 2½ hours per revolution (about .007 R. P. M.)

Example 2

Solvent composition:
  50% carbon tetrachloride
  45% normal pentane
  5% methanol
Binder: 100 centipoises N-type ethyl cellulose Fluorescent material: 3500° white phosphor
Plasticizer: dibutyl phthalate equal to twice the weight of the ethyl cellulose
Viscosity: 2000 centipoises
Specific gravity: 1.48
Rate of rotation: 1¼ hours per revolution (about .014 R. P. M.)

Besides nitrocellulose, other suitable binders such as ethyl cellulose may also be used. The only requirement of the binder is that it be soluble in some mixture of solvent having a sufficiently fast evaporation rate, and that any organic portion of the binder be removable in a subsequent baking operation.

Solvents that have been found to have suitable evaporation rates include such materials as acetone, ethyl ether, petroleum ether, methylene chloride, chloroform, carbon tetrachloride, normal pentane, methyl acetate, and methanol. Many others having evaporation rates similar to these and therefore applicable to use in this invention when combined with a suitable binder will be readily apparent to those skilled in the art of lacquers and solvents.

The speed with which the suspension may be applied to the curved glass tube is substantially slower than the speed with which the conventional tubes may be coated. If the tube is coated too fast a streaky uneven film results.

I have found that a satisfactory coating may be obtained by mounting the curved glass tube in a vertical plane partially filling it with the coating suspension and then rotating the tube slowly so as to deposit a thin even film of the suspension on the interior surface of the tube. As the tube is rotated a wet film of the coating suspension is deposited on the wall of the tube and the coating suspension gradually moves around the rest of the tube which has not as yet been touched by the coating suspension.

One of the primary factors in determining the rate of speed at which the tube may be rotated is the speed with which the film of coating suspension which has been deposited on the wall of the tube dries. The deposited film must be permitted to dry enough to eliminate the possibility of it flowing sideways under the influence of gravity after the main body of the coating solution has been caused to move along within the tube. This prevents streaks and light and heavy areas.

In order to coat that portion of the curved tube which was not filled with the coating suspension initially, it is desirable to attach to the end of the tube adjacent the unfilled portion a suitable extension to collect the main body of the coating solution as the tube is rotated. Any convenient arrangement may be made to accomplish this. For example, I have employed a glass tube extension coupled to the curved tube by means of a rubber tube coupling and a flask into which the coating suspension drains.

I have found that a uniform turning of the tube at about 2½ hours per revolution is satisfactory to produce a uniformly smooth coating when the suspension of Example 1 is employed. However, as pointed out above, the speed with which the tube is rotated and coated depends to a great extent on the drying rate of the deposited film of coating suspension. The rotation rate of the order of 2½ hours per revolution has been found desirable when the luminescent material is suspended in a nitrocellulose lacquer, the nitrocellulose being of the order of 1200 seconds viscosity, and the solvent portion comprising a mixture of about 25% ethyl ether and 75% acetone by volume, and the viscosity of the coating suspension being of the order of 4000 centipoises.

The basic principle to be borne in mind is that the tube must be rotated slowly enough so that only a small area of the coated tube will be drying at any given interval of time. It may be said that the tube is being coated too fast when the main body of the coating suspension is caused to move through the tube at a speed which will leave a wet film of coating covering an area large enough to cause the excess coating which has not firmly adhered to the wall of the tube or dried, to run in a direction which is not substantially vertical. When this condition exists a streaky, uneven coating results. Thus it may be seen that the speed with which a tube may be satisfactorily coated depends to a great extent on the speed with which the deposited film of coating material dries. This in turn, is dependent in part on the evaporation rate of the solvent used in the nitrocellulose lacquer and on the rate of diffusion of the solvent vapor to the open end of the tube.

In carrying out the process of my invention I have developed the equipment illustrated in the drawing. It will be apparent to those skilled in the art that other mechanical devices may be employed to practice the coating principles herein enunciated without departing from the spirit of the invention.

Figure 1:
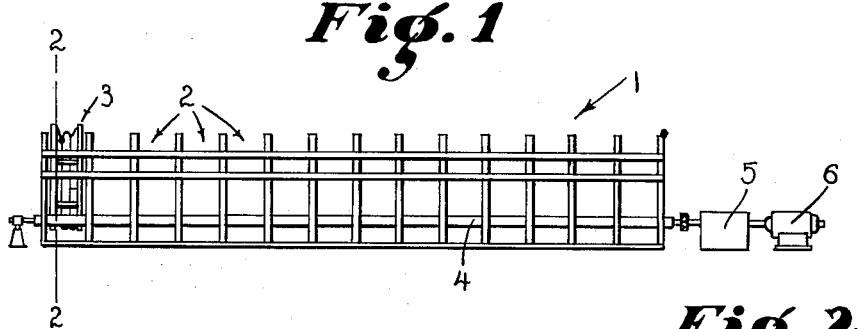
Figure 1 is a side elevational view of the apparatus employed in coating curved tubing.

The apparatus of my invention as shown in Figure 1, comprises a frame 1 provided with a plurality of sections 2 within which tubing holders 3 are disposed during the coating operation. When the tubing holders 3 are disposed in the several sections 2, they rest on two driven shafts 4 which are connected through a speed reduction mechanism 5 to a motor 6 which drives the shafts 4.

Figures 2, 3:
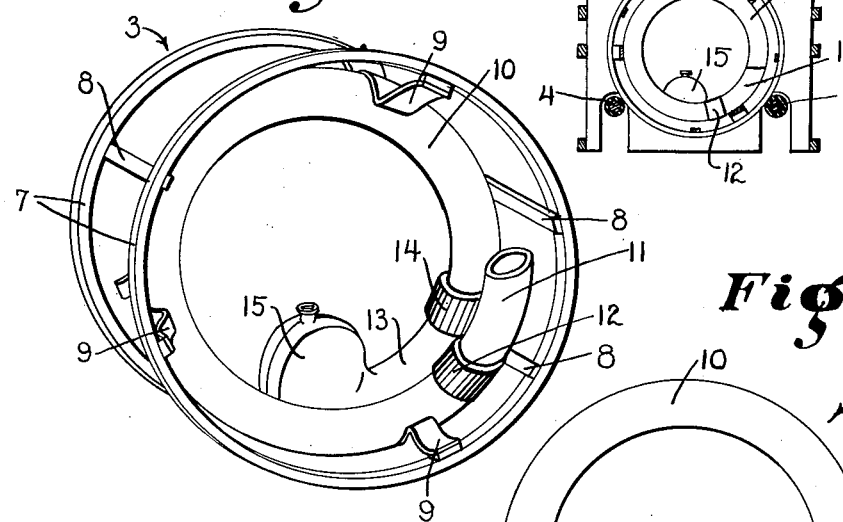
Figure 2 is a sectional view taken along the line 2—2 of Figure 1.
Figure 3 is a perspective view of a tubing holder with a curved tube disposed therein and the auxiliary apparatus employed in the coating process connected to the tube.

The tubing holder 3 as shown in Figure 3 comprises a pair of spaced rings 7 connected by the spacing members 8 and provided with a plurality of resilient clips 9 which hold the tubing 10 in position. The auxiliary apparatus connected to the tubing 10 during the coating operation comprises an extension 11 connected to the filling end of the tubing by means of a resilient coupling 12 and an extension 13 connected to the discharge end of the tubing by means of a resilient coupling 14, the extension 13 terminating in a reservoir 15.

Figure 4 shows the tubing 10 with the extensions 11 and 13 and the reservoir 15 connected thereto. This apparatus, hereinafter called the tubing assembly 17, is shown, in Figure 4, in the position in which it is disposed at the start of the coating operation. A quantity of luminescent coating suspension 16 is introduced into the tubing 10 through the extension 11. I have found it desirable to introduce the coating suspension 16 into the tubing 10 through the extension 11 rather than introduce it directly into the tubing because it insures a smooth, even film of coating on the wall of the tubing near the filling end. I have found that when an extension is not used and the coating suspension is introduced directly, the quality of the coating deposited adjacent this end of the tubing is not always entirely satisfactory. This extension may be removed after the coating suspension has been introduced into the tubing 10.

The tubing assembly 17 is mounted in the tubing holder 3 as shown in Figure 3 and placed in one of the sections 2 in the frame 1 as shown in Figure 1. When the motor 6 is energized the driven shafts 4 turn and thereby cause the tubing holder 3 and the tubing assembly 17 to rotate. The rotation of the tubing assembly 17 causes the column of coating suspension 16 to move through the tubing 10 depositing a film of coating in its wake.

It has been found desirable to cover the filling end of the tube 10 with a disc or wafer after the extension 11 has been removed in order to control and limit the drying rate of the deposited film of coating suspension during the early stage of the coating operation. When this is not done it has been found that the film of coating deposited adjacent this end of the tubing dries faster than the film of coating deposited on the rest of the tube. A uniform drying rate is advantageous to insure a smooth even coating throughout the entire length of the tubing.

Figure 5 shows the disposition of the several elements of the tubing assembly 17 after a large portion of the tubing has been coated. The numeral 18 designates the coating which has dried and the numeral 19 the coating which is still wet. The column of coating suspension 16 has moved through the tubing 10 so that now some of it has moved into and through the extension 13 and into the reservoir 15.

As was pointed out above, it is essential that the tubing be rotated at a speed which will insure the disposition of the drying area in a substantially vertical plane. This is illustrated in Figure 5 wherein the area designated by the numeral 19 represents the wet or drying coating. When a film of coating is deposited, some of the coating drys and adheres to the tubing and the excess of the suspension runs off under the influence of gravity. To insure a smooth even coating it is necessary that the drainage of the excess coating suspension be in substantially the same direction at all times. This is accomplished by utilizing a coating suspension of the type described above and rotating the tubing at a speed which will insure the disposition of the drying area in a substantially vertical plane at all times. This is illustrated in Figure 5 where the coated portion of the tubing 10 which has not yet dried and which is represented by the numeral 19 is disposed in a substantially vertical plane.

What I claim is:

The method of coating a curved glass tube with a suspension of luminescent material which comprises: disposing the tube substantially vertically; introducing a body of said suspension into said tube through one end thereof; rotating said tube to thereby effect movement of the body of said suspension therein and deposition of a coating of said suspension on the wall thereof; and drying said deposited coating, the speed of rotation of said tube being such that that portion of the tube on which the coating which has not yet dried has been deposited is disposed substantially vertically.

ERIC L. MAGER.

REFERENCES CITED

The following references are of record in the file of this patent:

UNITED STATES PATENTS

| Number | Name | Date |
|---|---|---|
| 949,156 | Murray | Feb. 15, 1910 |
| 1,188,776 | Hewitt | June 27, 1916 |
| 1,956,722 | Kennedy | May 1, 1934 |
| 2,179,288 | Freck | Nov. 7, 1939 |
| 2,192,869 | Pearce | Mar. 5, 1940 |
| 2,318,060 | Cortese | May 4, 1943 |
| 2,413,437 | Demb | Dec. 31, 1946 |

FOREIGN PATENTS

| Number | Country | Date |
|---|---|---|
| 437,755 | Great Britain | Nov. 5, 1935 |